United States Patent
Park et al.

(10) Patent No.: US 12,235,166 B2
(45) Date of Patent: Feb. 25, 2025

(54) PROBE SYSTEM FOR LOW-TEMPERATURE HIGH-PRECISION HEAT TRANSPORT MEASUREMENT AND MEASUREMENT DEVICE INCLUDING SAME

(71) Applicants: SEOUL NATIONAL UNIVERSITY R&DB FOUNDATION, Seoul (KR); INSTITUTE FOR BASIC SCIENCE, Daejeon (KR)

(72) Inventors: Je Geun Park, Seoul (KR); Ha Leem Kim, Seoul (KR); Matthew John Coak, Coventry (GB)

(73) Assignees: SEOUL NATIONAL UNIVERSITY R&DB FOUNDATION, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 762 days.

(21) Appl. No.: 17/606,279

(22) PCT Filed: Oct. 17, 2019

(86) PCT No.: PCT/KR2019/013669
§ 371 (c)(1),
(2) Date: Feb. 11, 2022

(87) PCT Pub. No.: WO2020/218690
PCT Pub. Date: Oct. 29, 2020

(65) Prior Publication Data
US 2022/0163400 A1    May 26, 2022

(30) Foreign Application Priority Data
Apr. 26, 2019   (KR) .................. 10-2019-0049063

(51) Int. Cl.
*G01K 1/14*   (2021.01)
*G01K 1/02*   (2021.01)
(Continued)

(52) U.S. Cl.
CPC ............... *G01K 1/14* (2013.01); *G01K 1/026* (2013.01); *G01K 7/34* (2013.01); *G01K 13/006* (2013.01)

(58) Field of Classification Search
CPC ............ G01K 1/14; G01K 1/026; G01K 7/34; G01K 13/006; G01K 13/02; G01K 1/16;
(Continued)

(56) References Cited

U.S. PATENT DOCUMENTS 5,258,710 A  * 11/1993 Black ............... G01R 33/34053
                                                324/309
9,028,140 B2 *  5/2015 Kamrat .................. G01K 13/02
                                                374/100
(Continued)

FOREIGN PATENT DOCUMENTS

CN       204964423 U      1/2016
CN       106596671 A      4/2017
(Continued)

OTHER PUBLICATIONS

17606279_2024-09-19_JP_2010540904_A_H.pdf,Dec. 24, 2010.*
(Continued)

*Primary Examiner* — Gail Kaplan Verbitsky
(74) *Attorney, Agent, or Firm* — Bridgeway IP Law Group, PLLC; Sang Ho Lee; Hyun Woo Shin (57) ABSTRACT

Provided is a probe system for low-temperature high-precision heat transport measurement, the probe system including a sample loader where a sample is loaded. In the probe system for low-temperature high-precision heat transport measurement, the sample loader includes a first frame including a sample loading space, and a second frame including an open end coupled to the first frame to accommodate the sample loading space.

20 Claims, 8 Drawing Sheets

(51) Int. Cl.
*G01K 7/34* (2006.01)
*G01K 13/00* (2021.01)
(58) Field of Classification Search
CPC .......... G01K 13/026; G01K 2013/026; G01K 2203/00
See application file for complete search history.

(56) References Cited

U.S. PATENT DOCUMENTS

| | | |
|---|---|---|
| 2007/0234751 A1 | 10/2007 | Nagamune |
| 2012/0110707 A1 | 5/2012 | Chopra |

FOREIGN PATENT DOCUMENTS

| | | | | |
|---|---|---|---|---|
| CN | 107037264 | A | 8/2017 | |
| JP | 2010540904 | A * | 12/2010 | |
| JP | 6161327 | B2 * | 7/2017 | |
| JP | 2018004637 | A * | 1/2018 | ............ G01N 1/42 |
| KR | 101163070 | B1 | 7/2012 | |
| KR | 20140106223 | A | 9/2014 | |
| KR | 101655906 | B1 | 9/2016 | |
| KR | 101722007 | B1 | 3/2017 | |
| KR | 101901554 | B1 * | 9/2018 | |
| KR | 101992478 | B1 | 6/2019 | |
| RU | 2271583 | C1 * | 3/2006 | |
| WO | 2018030598 | A1 | 2/2018 | |
| WO | WO-2023082073 | A1 * | 5/2023 | ............ G01K 1/026 |

OTHER PUBLICATIONS

17606279_2024-09-19_KR_101901554_B1_H.pdf,Sep. 21, 2018.*
17606279_2024-09-19_WO_2023082073_A1_H.pdf,May 19, 2023.*
17606279_2024-09-19_JP_2018004637_A_H.pdf,Jan. 11, 2018.*
17606279_2024-09-19_RU_2271583_C1_H.pdf,Mar. 10, 2006.*
Zhou et al. "Reducing the uncertainty of self-heating in high-accuracy cryogenic temperature measurements" Physics Procedia 67 ( 2015) 1157-1163.

* cited by examiner

PROBE SYSTEM FOR LOW-TEMPERATURE HIGH-PRECISION HEAT TRANSPORT MEASUREMENT AND MEASUREMENT DEVICE INCLUDING SAME

TECHNICAL FIELD

The present invention relates to a measurement device capable of precisely measuring physical properties of a material at a low temperature, and more particularly, to a probe system for low-temperature high-precision heat transport measurement, the probe system being capable of extremely precisely measuring temperature variations of a material, and a measurement device including the same.

BACKGROUND ART

A low-temperature high-precision measurement device including a sealed refrigerator capable of maintaining a low temperature is used as a device for precisely measuring physical properties of a sample. In this specification, the low temperature also includes a cryogenic temperature range implemented by using liquid helium or the like. A sample, various physical properties of which are to be measured, may be loaded in a chamber-type refrigerator capable of maintaining a low temperature by using liquid helium or the like. Such a measurement device may further include a device capable of applying a magnetic field to the sample maintained at the low temperature. The measurement device requires extremely precise temperature measurement and temperature control, and also requires excellent thermal insulation from outside.

The physical properties measured using the low-temperature high-precision measurement device capable of maintaining a low temperature and of applying a magnetic field include a thermal Hall effect (THE). Measurement of the thermal Hall effect at a low temperature normally requires very precise temperature measurement and temperature control under a high magnetic field. In addition, because a very long time is generally taken to measure the thermal Hall effect, a technology for completely thermally isolating a thermometer, a heater, and a sample from other structures is required.

As a general thermometer for the thermal Hall effect, a resistance thermometer for measuring a temperature of a sample by measuring a resistance while varying the temperature of the sample has been used. However, the resistance thermometer causes deviations in temperature measurement due to a magnetoresistance effect when a high magnetic field is applied. To solve the deviations, two-dimensional temperature calibration of the thermometer based on the temperature and the magnetic field, for which a long time is taken, is required. In addition, the precision of the thermometer differs depending on a temperature range and thus different types of thermometers need to be used for precise temperature measurement in different temperature ranges.

DETAILED DESCRIPTION OF THE INVENTION

Technical Problem

The present invention provides a probe system for low-temperature high-precision heat transport measurement, the probe system being loaded in a refrigerator to rapidly, easily, and extremely precisely measure physical properties of a sample, and a low-temperature high-precision heat transport measurement device including the same. However, the scope of the present invention is not limited thereto.

Technical Solution

According to an aspect of the present invention, there is provided a probe system for low-temperature high-precision heat transport measurement, the probe system including a sample loader where a sample is loaded.

According to an embodiment of the present invention, the sample loader includes a first frame including a sample loading space, and a second frame including an open end coupled to the first frame to accommodate the sample loading space.

According to an embodiment of the present invention, the first frame includes a sample supporter on which electrical terminals for conducting electricity from outside are provided, a plurality of first support rods provided on a surface of the sample supporter to extend in a direction away from the surface, made of a thermal insulator, and coupled to support lines, a plurality of second support rods provided on a surface of the sample supporter to extend in a direction away from the surface, made of a high thermal conductor, and capable of holding the sample, thermometers and a heater suspended between the first support rods by the support lines, and electricity supply lines connected from the electrical terminals to the thermometers and the heater.

According to an embodiment of the present invention, the probe system may further include wire terminals coupled to the thermometers and the heater to connect the sample to the thermometers and the heater.

According to an embodiment of the present invention, the probe system may further include a sample holder coupled to an end of a second support rod and capable of holding the sample.

According to an embodiment of the present invention, the probe system may further include a puck coupled to another end of the second frame, and the puck may be in contact with a cooling controller of a low-temperature high-precision measurement device.

According to an embodiment of the present invention, one or more second support rods other than the second support rod holding the sample may be in direct contact with the second frame.

According to an embodiment of the present invention, the electricity supply lines may include electrical line connectors adhered to partial regions of outer circumferential surfaces of the first support rods to extend in the direction where the first support rods extend, first conductive wires for connecting the electrical line connectors to the electrical terminals, and second conductive wires having ends coupled to ends of the electrical line connectors, and other ends connected to the heater and the thermometers.

According to an embodiment of the present invention, the thermometers may include $SrTiO_3$ capacitance thermometers.

According to an embodiment of the present invention, the first support rods may include ceramic, glass fiber, or resin.

According to an embodiment of the present invention, the support lines may include a polymer material.

According to an embodiment of the present invention, the second support rods may include a metal material.

According to an embodiment of the present invention, one or more of the first and second conductive wires may include platinum (Pt)/iridium (Ir) alloy.

According to an embodiment of the present invention, the sample holder may include sapphire.

According to an embodiment of the present invention, the probe system may further include a probe head, a probe connector connected to an end of the probe head, and a heat sink including an end connected to another end of the probe connector.

According to an embodiment of the present invention, the probe connector may include a core frame, and coaxial cables extending to be wound around an outer circumferential surface of the core frame.

According to an embodiment of the present invention, the sample loader may be detachably connected to the heat sink.

According to an embodiment of the present invention, the end of the heat sink may be in contact with an inner wall of a chamber of a low-temperature high-precision measurement device by using contact fingers or cold fingers.

According to an embodiment of the present invention, the heat sink may include a body made of a metal material, and coaxial cables extending to be wound around an outer circumferential surface of the body. In this case, shields of the coaxial cables may be electrically connected to the second frame.

According to another aspect of the present invention, there is provided a low-temperature high-precision heat transport measurement device including the above-described probe system. In this case, the probe system includes a plurality of $SrTiO_3$ capacitance thermometers, and the plurality of $SrTiO_3$ capacitance thermometers are connected to one capacitance measurement bridge through coaxial relays.

Advantageous Effects

As described above, according to an embodiment of the present invention, a probe system for low-temperature high-precision heat transport measurement, the probe system being loaded in a measurement device including a refrigerator to easily, rapidly, and extremely precisely measure physical properties of a sample, and a low-temperature high-precision measurement device including the same may be provided. Using the probe system according to an embodiment of the present invention, not only a thermal Hall effect may be precisely measured but also physical properties such as a spin Nernst effect and a spin Seebeck effect may be extremely precisely and easily measured. However, the scope of the present invention is not limited to the above-described effects.

BEST MODE

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Representative problems of temperature measurement at a low temperature include deviations in temperature measurement due to a self-heating effect and a magnetoresistance effect in a high magnetic field. In addition, a technology for thermally isolating a thermometer, a heater, and a sample from other structures is required.

To solve the problems, the present invention provides a probe system for low-temperature high-precision heat transport measurement, the probe system being capable of very precise temperature measurement under a high magnetic field, and including a sample loader which is detachable and easily mountable.

Herein, the probe system is a module which includes a sample to be measured and elements required for measurement, e.g., thermometers and a heater, and is inserted into a chamber of a low-temperature high-precision measurement device, and may include electrical wires for electrically connecting the elements to an external power supply to control the elements.

Figure 1:
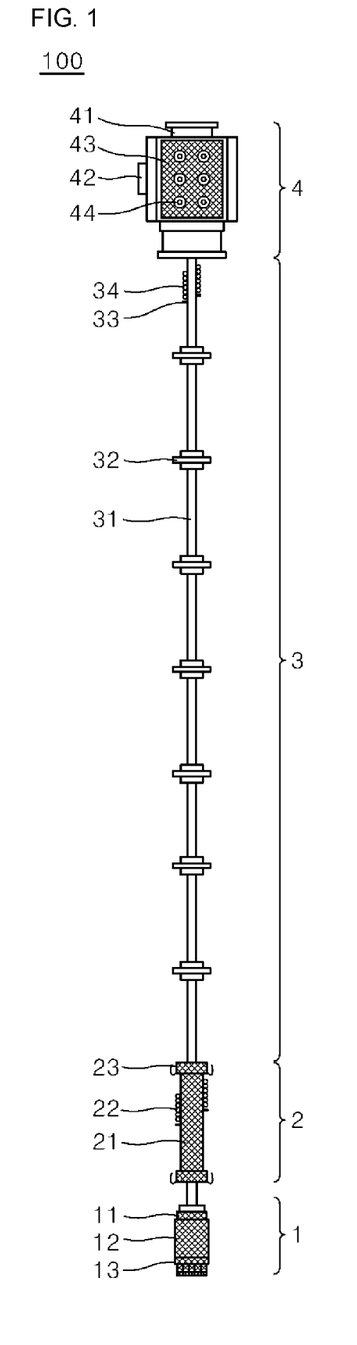
FIG. 1 is a schematic diagram of a probe system for heat transport measurement, according to an embodiment of the present invention.

FIG. 1 is a schematic diagram of a probe system 100 for low-temperature high-precision heat transport measurement (hereinafter simply referred to as the "probe system"), according to an embodiment of the present invention. The current embodiment will now be described with reference to FIG. 1.

In an embodiment of the present invention, the probe system 100 may be mounted in a chamber of a low-temperature high-precision measurement device containing a low-temperature liquid such as liquid helium. The chamber may be maintained at a vacuum level, e.g., about $10^{-6}$ mbar to about $10^{-7}$ mbar. In an embodiment of the present invention, the probe system 100 may be designed to operate in a wide temperature range of 2K to 250K.

Referring to FIG. 1, the probe system 100 according to an embodiment of the present invention includes a probe head 4 provided at the top of the probe system 100, a probe connector 3 connected to an end of the probe head 4 and extending straight downward from the probe head 4, and a heat sink 2 connected to an end of the probe connector 3, and a sample loader 1 is detachably connected to an end of the heat sink 2.

The probe head 4 includes a connection port 42 for connecting an external power supply to a power cable, and a pumping port 41 connected to a vacuum pump. A board 43 is attached to the probe head 4, and coaxial cable connectors 44 are mounted on the board 43. Because the precision of capacitance measurement may be lowered when shields of coaxial cables 34 are connected to the probe connector 3, the board 43 may be made of an insulator. In an embodiment, the board 43 may be made of polymer plastic. The probe system 100 needs to be joined to a cooling controller at the bottom and to a vacuum flange at the top, and thus a total length thereof may be adjusted by controlling a location of the probe head 4. The probe head 4 may be fastened to a core frame 31 of the probe connector 3 by using a fastening member, e.g., a screw.

The probe head 4 may protrude from the chamber of the low-temperature high-precision measurement device so as be exposed to room temperature. Therefore, the probe connector 3 has a configuration for minimizing leakage of heat to a space where a sample is loaded.

Specifically, the probe connector 3 includes the core frame 31, and a thermal barrier 32 provided in the form of detachable baffles. The core frame 31 may have a form of a hollow pipe, and be made of a metal material, e.g., stainless steel. The thermal barrier 32 may have a form of baffles, and an outer circumferential surface thereof may be in physical contact with an inner wall of the chamber to transport heat, which is transported along the core frame 31, toward the chamber and prevent the heat from being transported to the space where the sample is loaded. The thermal barrier 32 may be detachable.

According to an embodiment of the present invention, $SrTiO_3$ capacitance thermometers are used as thermometers (see reference numeral 114 of FIG. 2) for measuring temperatures of the sample. Therefore, the coaxial cables 34 having an electrical shielding function are used as cables connected to the thermometers. The coaxial cables 34 may be wound around the core frame 31 and the thermal barrier 32 as illustrated in FIG. 1 to facilitate heat exchange between the coaxial cables 34 and the core frame 31. In order to minimize leakage of heat through the coaxial cables 34, micro-coaxial cables made of stainless steel may be used.

A power cable 33 may be additionally wound around the core frame 31 and the thermal barrier 32 to supply a current to a heater (see reference numeral 115 of FIG. 2) and, in this case, the power cable 33 may be made of, for example, beryllium copper (BeCu).

The core frame 31 and the coaxial cables 34 are designed to minimize leakage of heat from room temperature, but plastic sheaths of the coaxial cables 34 slow down an escape of heat from the heat sink 2 toward the low-temperature high-precision measurement device. In addition, because the cooling controller of the low-temperature high-precision measurement device is joined to the bottom of the probe system 100 but leakage of heat from room temperature starts from the probe head 4, a professional refrigerating engineering technology for solving the above problem is required.

As such, contact fingers or cold fingers 23 made of a material having a high thermal conductivity, e.g., copper (Cu) alloy, may be welded around both ends of a body 21 of the heat sink 2 such that the bottom of the probe system 100 where the sample is located may be in strong contact with the inner wall of the chamber of the low-temperature high-precision measurement device. Due to the above configuration, heat leaked from the probe head 4 may flow through the heat sink 2 to the inner wall of the chamber of the low-temperature high-precision measurement device such that a temperature of the space where the sample is loaded may be equal to a temperature of a temperature controller (i.e., the cooling controller) of the low-temperature high-precision measurement device. Therefore, the heat sink 2 may prevent temperature variations in an environment of the sample for a long time and enable precise measurement. The heat sink 2 may use a material having a high thermal conductivity, e.g., oxygen-free copper, and the surface thereof may be plated with gold (Au) to improve thermal conductivity.

The plastic sheaths of the coaxial cables 34 around an outer circumferential surface of the body 21 of the heat sink 2 may be partially removed and, instead, another electrical insulator having a high thermal conductivity may be wrapped to form sheaths having a high thermal conductivity. As such, the body 21 of the heat sink 2 and the coaxial cables 22 may easily exchange heat but be electrically insulated from each other. For example, sheaths for replacing the plastic sheaths may be formed by wrapping cigarette paper around the parts from which the plastic sheaths are removed, and then applying a transparent coating such as varnish thereto. As described above, thermal conductivity may be improved by winding the sheath-replaced coaxial cables 22 around the heat sink 2. Optionally, the outer circumferential surface of the body 21 may be wrapped with an insulator, e.g., cigarette paper, and coated with varnish to additionally form a thin insulating layer.

The sample loader 1 mounted on a lower end of the probe system 100 may be detachably connected to the heat sink 2. Because the sample loader 1 is detachable, a user may mount the sample, and various components required to measure physical properties of the sample, e.g., the thermometers and the heater, in a space independent of the other components of the probe system 100.

The sample loader 1 includes a first frame 11 including a sample loading space where the sample is loaded, and a second frame 12 detachably coupled to the first frame 11.

The first frame 11 may be attached to the lower end of the probe system 100, and the second frame 12 may serve as a shield for protecting various structures mounted in the sample loading space of the first frame 11 when the probe system 100 is inserted into the low-temperature high-precision measurement device. The second frame 12 may serve not only as a physical shield but also as a radiation shield for equalizing a temperature of a wall surrounding the sample.

Meanwhile, a puck 13 is provided at a lower end of the second frame 12, and is in direct contact with a cooling controller (not shown) included in the low-temperature test device. The sample loader 1 has a configuration in which the first and second frames 11 and 12 are physically coupled to each other, and thus may be thermally connected through the puck 13 to the cooling controller which is maintained at a low temperature. To increase the thermal connection effect, the first and second frames 11 and 12 may be made of a material having a high thermal conductivity, e.g., a metal material including Cu or Cu alloy. Meanwhile, the puck 13 may be coupled to the second frame 12 via an electrical insulator intervening therebetween.

Figure 2:
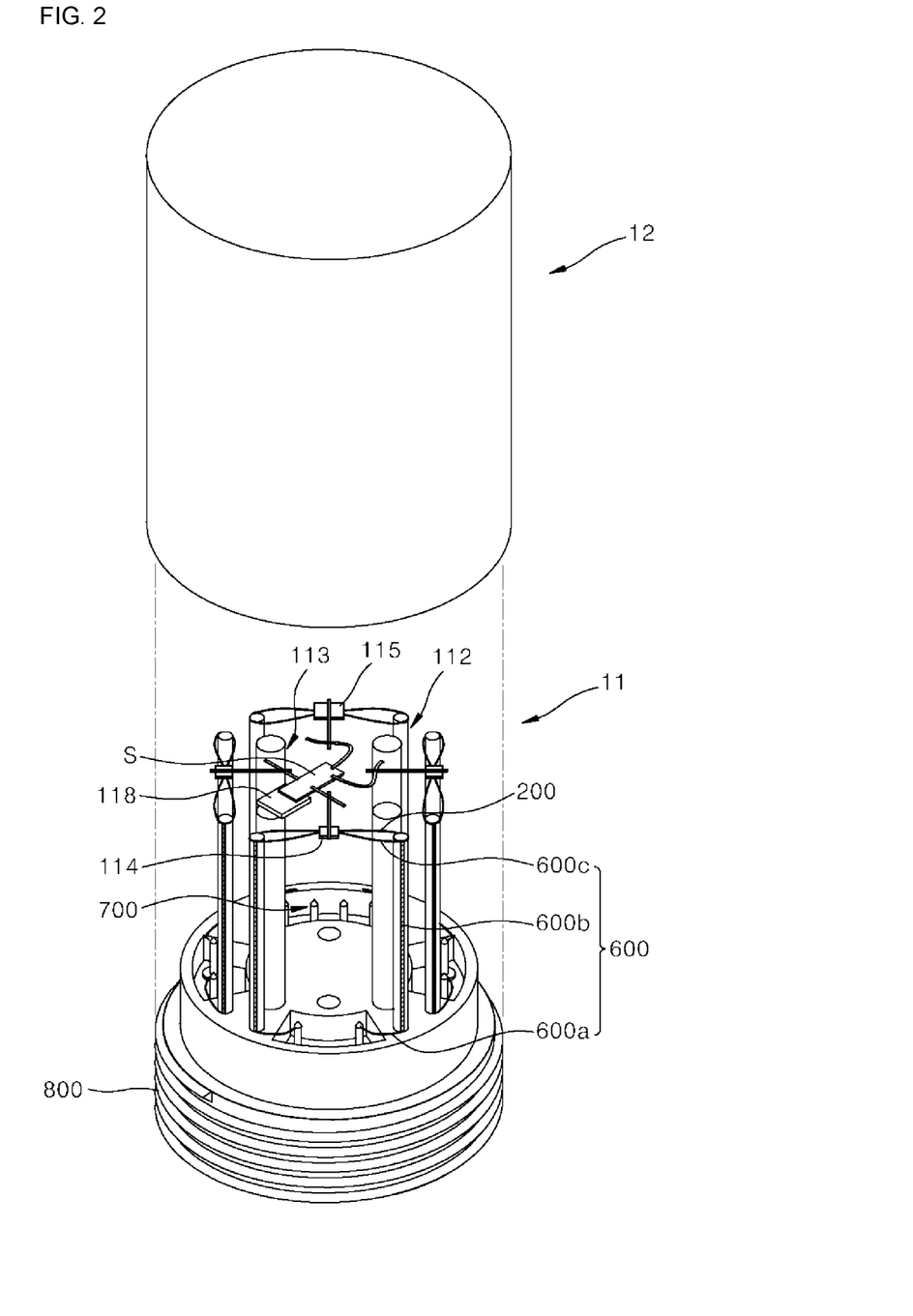
FIG. 2 is a perspective view of a sample loader included in a probe system for heat transport measurement, according to an embodiment of the present invention.
Figure 3:
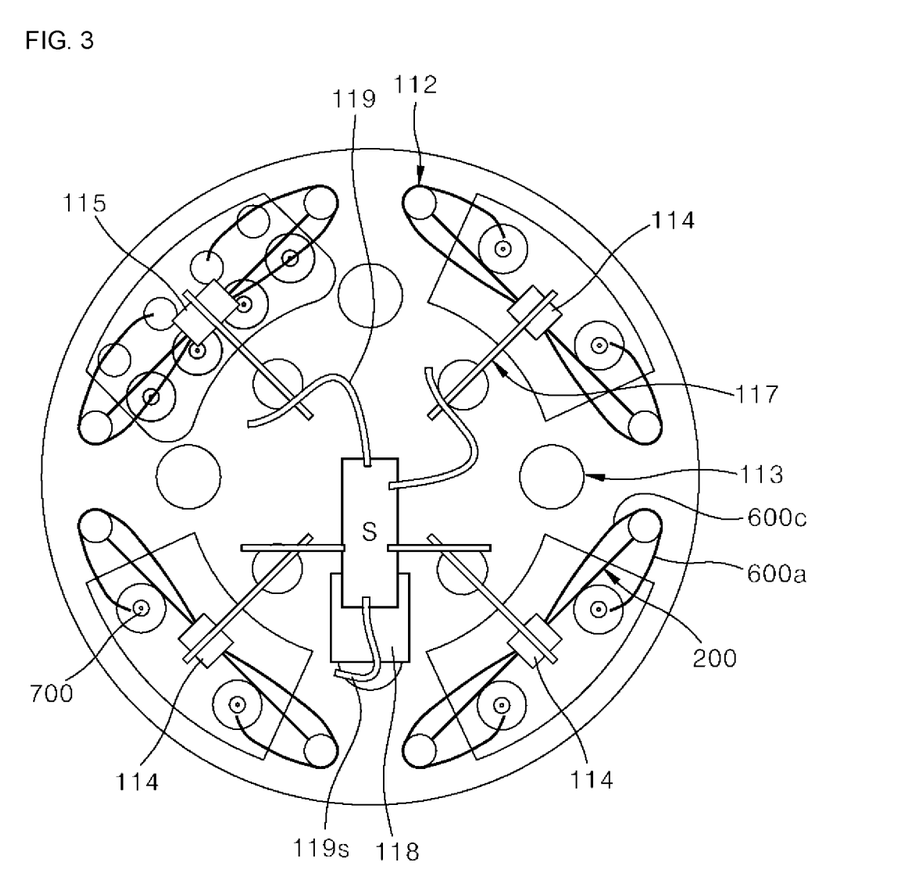
FIG. 3 is a plan view of a first frame included in a probe system for heat transport measurement, according to an embodiment of the present invention.

FIG. 2 is a perspective view of the first and second frames 11 and 12 of the sample loader 1, and FIG. 3 is a plan view showing that a sample S is loaded on the first frame 11. The sample loader 1 will now be described in detail with reference to FIGS. 2 and 3.

The sample loader 1 includes the first frame 11 including a sample loading space where the sample S is loaded, and the second frame 12 including an open end coupled to the first frame 11 to accommodate the sample loading space. For example, the first frame 11 may be detachably fastened to the second frame 12 through screw coupling. Small holes may be provided at both sides of the second frame 12 to achieve a vacuum state of the sample loading space.

The sample S to be measured, a heater 115 for heating the sample S, and thermometers 114 for measuring temperatures of the sample S are provided on the first frame 11.

Specifically, the first frame 11 includes a sample supporter 800, and first support rods 112 and second support rods 113 provided in a rod shape on a surface of the sample supporter 800 to extend in a direction away from the surface.

The sample supporter 800 may be made of a material having a high thermal conductivity, e.g., oxygen-free copper plated with Au, for thermal connection with a cooling controller of a test chamber. An outer circumferential surface of an end of the sample supporter 800 may be threaded for screw coupling with the second frame 12.

Electrical terminals 700 for conducting electricity from outside may be provided on partial regions of the sample supporter 800. The electrical terminals 700 may be connected to an external power supply from the partial regions of the sample supporter 800 while being insulated from the other regions of the sample supporter 800, and may be provided in the form of, for example, pins protruding from the surface of the sample supporter 800 as illustrated in FIG. 2.

A plurality of first support rods 112 may be provided, and support lines 200 are provided between the plurality of first support rods 112. By the support lines 200, the thermometers 114 and the heater 115 are suspended and spaced apart from the surface of the sample supporter 800. The first support rods 112 may be made of a material having excellent thermal insulation properties, e.g., ceramic, glass fiber, or resin.

FIGS. 2 and 3 show a configuration in which the thermometers 114 and the heater 115 are suspended between the first support rods 112 by the support lines 200 connected to the first support rods 112.

The support lines 200 may be made of polymer fiber serving as an electrical insulator and having excellent thermal insulation properties, e.g., nylon.

As paths electrically connected to the thermometers 114 and the heater 115, electricity supply lines connected to the electrical terminals 700, and the thermometers 114 and the heater 115 are provided. The electricity supply lines are paths for conducting electricity but leakage of heat through the paths need to be minimized. Particularly, in an embodiment of the present invention, the thermometers 114 and the heater 115 are floated and suspended from the surface of the sample supporter 800 by a certain distance.

As such, the electricity supply lines include electrical line connectors 600*b* (see FIG. 2) attached to partial regions of outer circumferential surfaces of the first support rods 112 to extend in the direction where the first support rods 112 extend. The electrical terminals 700 are connected to the electrical line connectors 600*b* by first conductive wires 600*a* (see FIG. 2). Meanwhile, the electrical line connectors 600*b* are connected to the thermometers 114 and the heater 115 by second conductive wires 600*c* (see FIG. 3).

In order to be attached to the outer circumferential surfaces of the first support rods 112, the electrical line connectors 600*b* may be produced by coating an electrical conductor on a surface of a polymer film. For example, as shown in FIG. 4B, the electrical line connectors 600*b* may be made using a polyimide film on which titanium (Ti) or Au is deposited. In this case, a width of the electrical line connectors 600*b* may be determined within a range where electrical conduction is enabled and transport of heat therethrough is minimized. The electrical line connectors 600*b* may be adhered to the partial regions of the outer circumferential surfaces of the first support rods 112 by using epoxy resin, or be adhered to the outer circumferential surfaces of the first support rods 112 by using a film having an adhesive surface.

The first conductive wires 600*a* (see FIG. 2) connect the electrical terminals 700 to the electrical line connectors 600*b* to conduct electricity therebetween. For example, the first conductive wires 600*a* may be soldered to the pin-shaped electrical terminals 700 attached to the sample loader 1. Ends of the second conductive wires 600*c* (see FIG. 3) may be connected to the electrical line connectors 600*b*, and the other ends thereof may be connected to the thermometers 114 and the heater 115 by using silver (Ag) epoxy or the like.

The first and second conductive wires 600*a* and 600*c* may also serve as paths for leakage of heat and thus may be configured to prevent leakage of heat as much as possible. As such, one or more of the first and second conductive wires 600*a* and 600*c* may be made of a material having a low thermal conductivity, e.g., platinum (Pt)/iridium (Ir) alloy.

As illustrated in FIG. 2, the second support rods 113 may extend in a direction parallel to the first support rods 112. A plurality of second support rods 113 may be provided and at least one thereof may be used to fix and support the sample S.

The sample S is thermally connected to the cooling controller of the low-temperature high-precision measurement device through the second support rod 113 holding the sample S. For thermal connection between the sample S and the cooling controller of the low-temperature high-precision measurement device, the second support rod 113 may be made of a material having a high thermal conductivity, e.g., a metal material including Cu or Cu alloy. An end of the second support rod 113 is physically coupled to the surface of the sample supporter 800 and thus the sample S is thermally connected to the sample supporter 800 through the second support rod 113 having a high thermal conductivity. As described above, the sample supporter 800 is physically coupled to the second frame 12, and the second frame 12 is connected through the puck 13 to the cooling controller. Therefore, due to the above configuration, the sample S held by the second support rod 113 is thermally connected to the cooling controller.

Additionally, one or more second support rods 113 other than the second support rod 113 holding the sample S may be in direct contact with the second frame 12. Therefore, paths for thermal connection to the cooling controller of the low-temperature high-precision measurement device may be added due to the physical contact between the one or more second support rods 113 and the second frame 12.

Meanwhile, due to the physical and direct contact between the one or more second support rods 113 and the second frame 12, when the sample loading space of the first frame 11 is inserted and fastened into a hollow space of the second frame 12, the first and second frames 11 and 12 may be prevented from excessively proceeding toward each other for fastening. Therefore, damage of the sample loading space of the first frame 11 by the second frame 12 may be prevented in the process of fastening the first frame 11 to the second frame 12 and, in this sense, the second support rods 113 may also serve as a guide member for indicating an appropriate fastening end time.

According to an embodiment of the present invention, as illustrated in FIGS. 2 and 3, the first frame 11 may further include a sample holder 118 coupled to an end of a second support rod 113 and capable of holding the sample S to prevent rotation of the sample S to another angle during measurement due to force of an external magnetic field. The sample holder 118 may include a material having excellent insulation and thermal transport properties, e.g., sapphire. As illustrated in FIGS. 2 and 3, a slice of sapphire serving as the sample holder 118 may be attached to the end of the second support rod 113, and the sample S may be fixed onto the slice of sapphire by using an adhesive. In this position, a surface of the sample S may be connected to the second support rod 113 by using a wire terminal 119S, and thus thermal connection between the sample S and the cooling controller of the low-temperature high-precision measurement device may be additionally enhanced.

According to an embodiment of the present invention, the thermometers 114 and the heater 115 are floated and suspended between the first support rods 112 by the support lines 200. Therefore, a connection structure for electrically/thermally connecting the sample S fixed and held on the end of the second support rod 113, to the thermometers 114 and the heater 115 is required. In this regard, first wire terminals 117 to be connected to the sample S may be coupled to and provided with the thermometers 114 and the heater 115. The first wire terminals 117 may be made of a material having a high electrical conductivity and a high thermal conductivity, e.g., Ag wires. The first wire terminals 117 may be connected to the thermometers 114 and the heater 115 by using, for example, varnish.

Referring to FIG. 3, second wire terminals 119 for facilitating connection to the first wire terminals 117 coupled to the thermometers 114 and the heater 115 may be coupled to the sample S. A user may previously couple a plurality of second wire terminals 119 onto the sample S and put the sample S on the sample holder 118 in an independent external space, and then connect the first wire terminals 117 to the second wire terminals 119. Locations where the second wire terminals 119 are coupled to the sample S may be properly selected considering locations of the first wire terminals 117. The first and second wire terminals 117 and 119 may be connected to each other by using Ag epoxy resin.

A temperature of a sample needs to be precisely measured to precisely measure physical properties of the sample. For example, in order to measure a thermal Hall effect, a longitudinal temperature difference $\Delta T_x$ and a transverse temperature difference $\Delta T_y$ may be calculated by measuring temperature values by using three thermometers, and a general thermal conductivity $k_{xx}$ and a thermal Hall conductivity $k_{xy}$ quantitatively representing the intensity of a Hall effect may be calculated using the temperature differences.

Normally, resistance thermometers may be used. However, difficult temperature calibration is required and a plurality of different-precision thermometers need to be used in different temperature ranges.

As such, according to an embodiment of the present invention, $SrTiO_3$ capacitance thermometers are used to solve the above problems and to more easily perform temperature measurement in various temperature ranges. Because capacitance measurement enables extremely precise measurement and a dielectric constant of $SrTiO_3$ greatly varies depending on temperature, temperatures may be precisely measured in a wide range by using the $SrTiO_3$ capacitance thermometers. In addition, a capacitance of $SrTiO_3$ is not theoretically affected by a magnetic field at all such that calibration based on the magnetic field is not required and the burden of measurement is reduced.

Figure 4A:
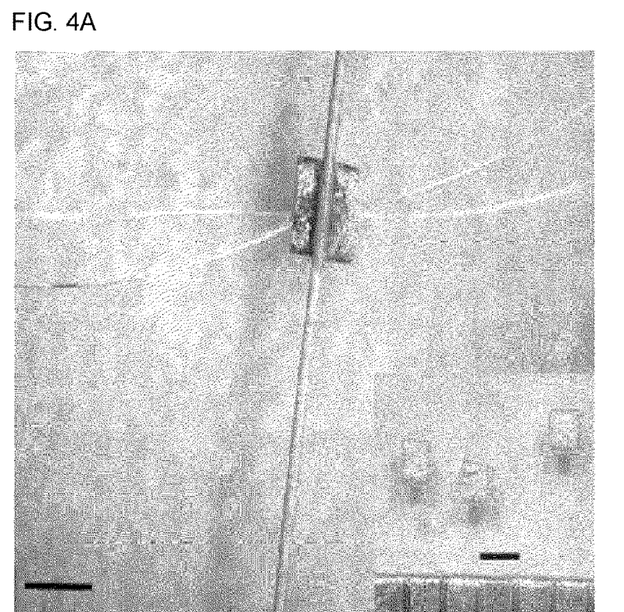
FIG. 4 shows a suspended state of a thermometer and a form of a polymer film used as an electrical line connector in a probe system for heat transport measurement, according to an embodiment of the present invention.
Figure 4B:
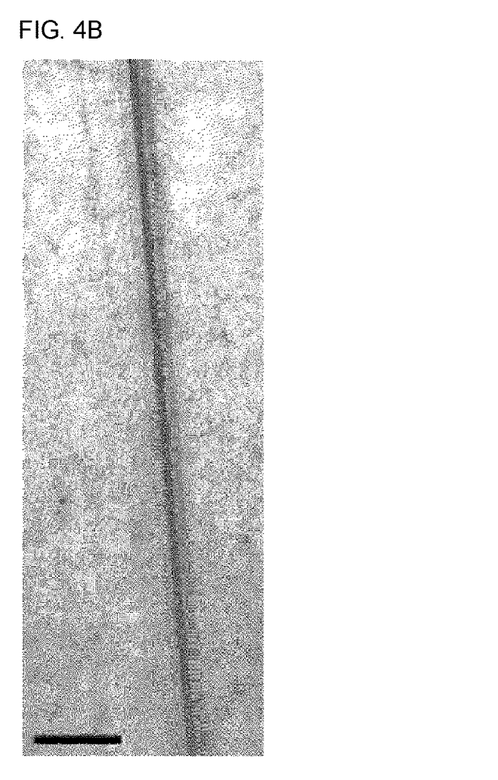

FIG. 4A shows that a $SrTiO_3$ capacitance thermometer is supported by nylon fibers serving as support lines. Referring to FIG. 4A, it is shown that the $SrTiO_3$ capacitance thermometer is coupled to an Ag wire serving as a first wire terminal to be connected to the sample S.

The sample loader 1 according to an embodiment of the present invention has a form of a module detachable from the probe system 100. Therefore, due to the modular properties, a plurality of sample-loaded sets may be prepared before a test by using a plurality of sample loaders, and various advanced tests may be performed on various samples by using the same probe system by slightly modifying a method of loading the sample in the sample loader.

Test examples implemented using a probe system for low-temperature high-precision heat transport measurement according to the present invention will now be described. However, the following test examples are merely for better understanding of the present invention, and the scope of the present invention is not limited thereto.

Test Examples

In order to produce a thermometer, a surface-processed 0.1 mm $SrTiO_3$ wafer purchased from MTI Corporation was processed into a 1 mm×1 mm square. Au was deposited on both surfaces of the cut wafer except for the edge thereof and then a cover layer capable of protecting the deposited Au was formed using Ag epoxy resin. Thereafter, a Pt/Ir wire was attached to the both surfaces by using the same epoxy. In order to prevent motion of the thermometer due to application of a high magnetic field, a 10 μm nylon fiber support line was attached to a surface of the thermometer and both ends of the attached support line were fixed to first support rods made of glass fiber. For thermal connection between a sample and the thermometer, a 125 μm wire terminal was attached to the other surface of the thermometer by using an adhesive. In this case, electrical connection was not made between the wire terminal and the thermometer. The thermometer was calibrated using in-situ calibration before a test.

A 15 kΩ chip resistor of TE Conductivity was used as a heater for applying heat to the sample. A dielectric substrate was abraded to a total thickness of 300 μm to reduce thermal capacity and increase a thermal conductivity of the heater. The heater was mounted on a first frame in the same manner as the thermometer. A Pt/Ir wire from a contact pad of the heater was connected using Ag epoxy resin to electrical line connectors attached to the first support rods, and the heater was fixed in the air by using a nylon fiber support line. For the electrical line connectors, a Kapton film made of ribbon-shaped polyimide and surface-deposited with Au and Ti was used.

Figure 5:
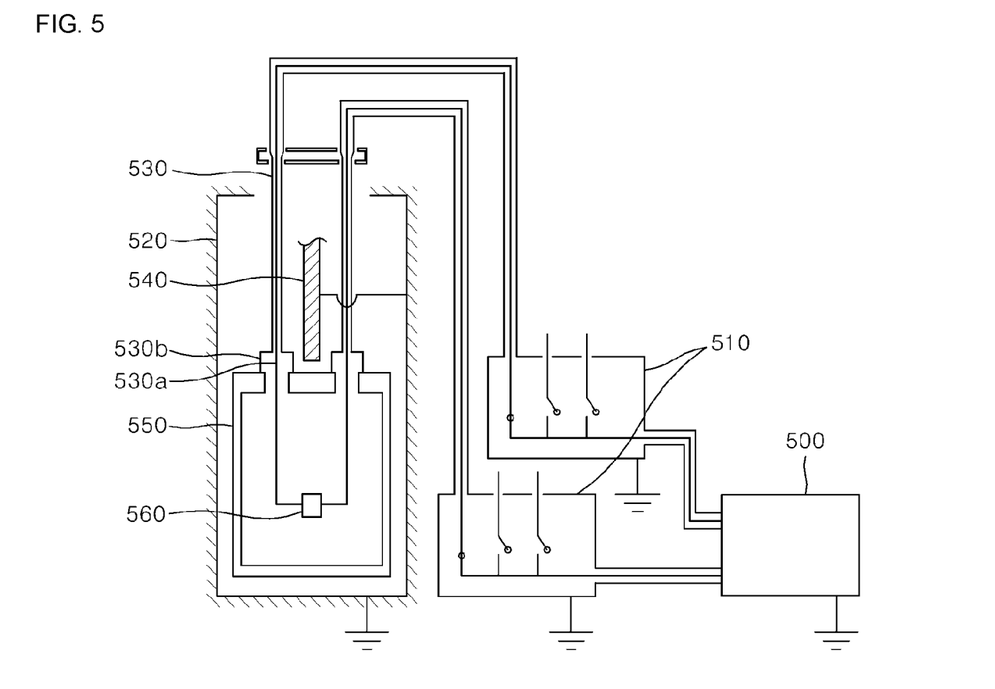
FIG. 5 is a circuit diagram of a probe system for heat transport measurement, according to an embodiment of the present invention.

FIG. 5 shows electrical connections among thermometers 560, a chamber 520 of a low-temperature test device, coaxial cables 530, a probe system 540, and measurement devices 500 and 510, which were used for measurement.

Capacitances of three thermometers 560 were measured using one capacitance measurement bridge 500 and two coaxial relays 510. A 2550A, 1 kHz AH bridge of Andeen-Hagerling was used as the capacitance measurement bridge 500, and URS74004 relays were used as the coaxial relays

510. The AH bridge 500 may measure a capacitance value of only one thermometer 560 at a time, and the coaxial relays 510 serve to sequentially switch between channels connected from the AH bridge 500 to the thermometers 560. Due to the above configuration, the precision of measurement may be increased. At an early stage of development, the present inventors have performed measurement by separately connecting a plurality of AH bridges to the thermometers 510 without using the coaxial relays 510, but have found that the precision of measurement was lowered in that case due to a closed circuit caused by grounding.

An input voltage of 0.5 V was used and an average time of 7 seconds was taken for measurement. A current was supplied to a heater by using a 2410 SourceMeter of Keithley. Tests were performed by adjusting an output value of the heater in such a manner that a longitudinal temperature difference was less than 5% of a temperature of the sample. The capacitance of each thermometer 560 was measured using three-terminal measurement. Obtaining of data and control of the external measurement devices 500 and 510 were performed using Matrix Laboratory (MATLAB)-based software.

The coaxial cables 530 extend along a stainless rod to a first frame of a sample loader and, in this position, cores 530a of the coaxial cables 530 are connected through electrical terminals of the first frame to the thermometers 560 whereas shields 530b of the coaxial cables 530 are electrically connected to a second frame 550 of the sample loader. Therefore, an internal space of the second frame 550 forms an electrically shielded environment and thus the precision of capacitance measurement is increased about 10 times.

Figure 6A:
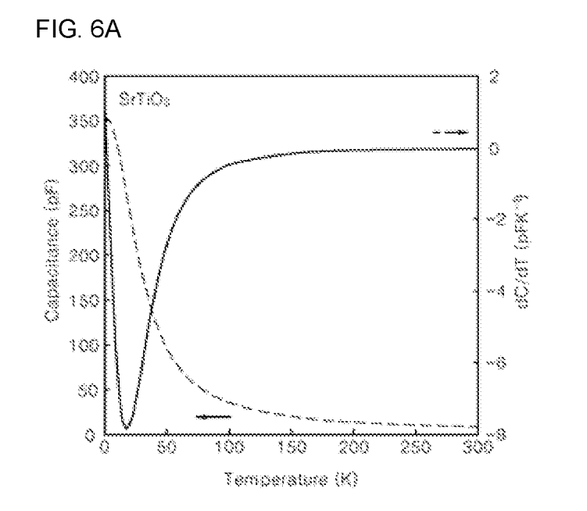
FIG. 6 includes graphs showing a measured capacitance value of a thermometer used in a probe system for heat transport measurement, a value obtained by performing differentiation on the capacitance value with respect to temperature, and a result of calculating the precision of capacitance measurement and the precision of temperature measurement, according to a test example of the present invention.
Figure 6B:
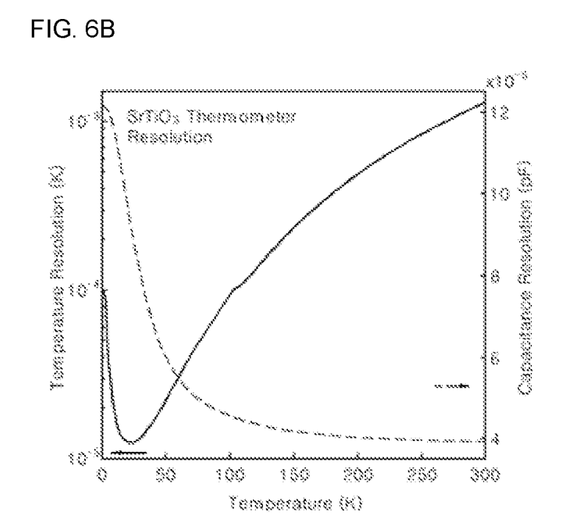

Test Example 1: Calculation of Precision of Temperature Measurement and Self-Heating Effect The precision of temperature measurement of a $SrTiO_3$ thermometer is related to sensitivity (e.g., dC/dT) of $SrTiO_3$ and the precision of capacitance measurement. The precision of temperature measurement of one of thermometers used for the test was calculated based on temperature. A capacitance value of the thermometer based on temperature, and a value obtained by performing differentiation on the capacitance value with respect to the temperature are shown in FIG. 6A. The precision of capacitance measurement and the precision of temperature measurement calculated using such information are shown in FIG. 6B. It is shown that the precision of temperature measurement in a range of 2K to 100K is greater than 0.1 mK.

A self-heating effect which occurs in measuring the capacitance of the thermometer is quantitatively calculated using the following equation.

$$P_e = I^2 * ESR = \frac{V^2 ESR}{ESR^2 + (\omega C)^{-2}}$$

In this case, ESR denotes a resistance value of a measurement circuit, C denotes a capacitance of a thermometer, V denotes a value of an input voltage used for measurement, and w denotes a frequency of an input signal. Three self-heating values of the thermometer, which are calculated using the above equation, are less than 7.5 nW in a range of 2K to 300K and less than 1 nW in a range of 25K to 300K. Therefore, it is resulted that an error of measurement caused by the self-heating effect is ignorable.

Test Example 2: Calculation of Error Based on Leakage of Heat

Leakage of heat through secondary paths is always present when measuring thermal transport properties, and the leakage causes an error of measurement. Because paths electrically connected to thermometers and a heater are required to measurement and control of the thermometers and the heater, the system may not be completely thermally isolated. Thermal conductances of the paths were quantitatively calculated based on temperature. Leakage of heat may be made through a Kapton film provided as an electrical line connector, Au deposited on the Kapton film, glass fiber (e.g., G10) provided as a first support rod, a Pt/Ir wire, and nylon fiber provided as a support line. From among the above-mentioned materials, thermal conductance values of non-metallic materials were based on publications of the Korea Institute of Applied Superconductivity and Cryogenics and thermal conductance values of metallic materials were calculated using the Wiedemann-Franz law.

Figure 7A:
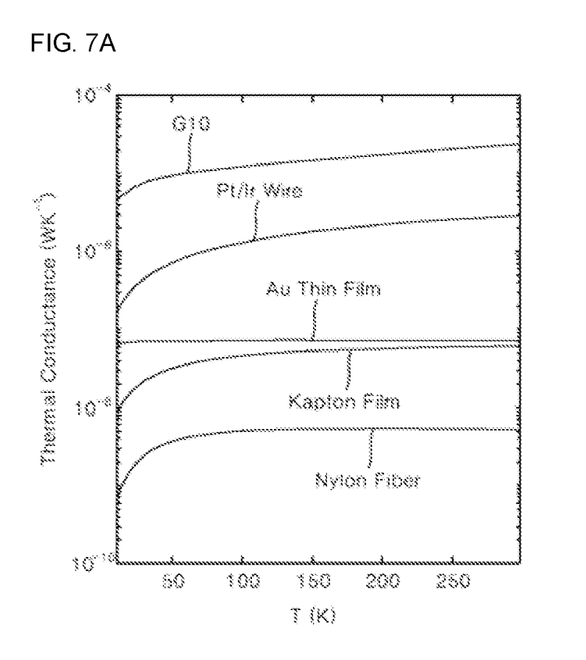
FIG. 7 includes graphs showing a result of calculating thermal conductances and a total effective thermal conductance of thermal insulation structures used in a probe system for heat transport measurement, based on temperature, according to a test example of the present invention.
Figure 7B:
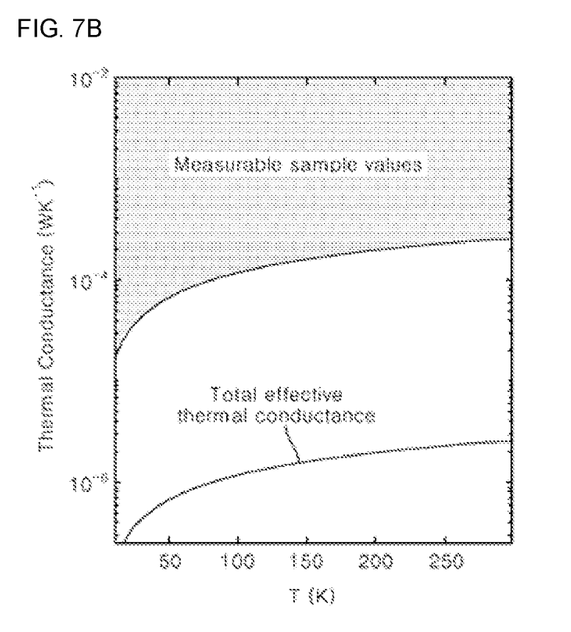

A thermal conductance of each path based on temperature is shown in FIG. 7A, and a total effective thermal conductance of the paths is shown in FIG. 7B. When a thermal conductance value of a measurable sample is included in a range of 'Measurable sample values', an error caused by leakage of heat exhibits a value less than 1%. Therefore, it is resulted that leakage of heat through the above-described paths is ignorable.

Test Example 3: Thermal Hall Effect Measurement Test

A thermal Hall effect of $Tb_2Ti_2O_7$, which is an antiferromagnetic material having a spin ice system, was measured to check the performances of the measurement setups and the measurement device. A high-purity monocrystalline $Tb_2Ti_2O_7$ sample was processed to a size of 1.48 mm×4.53 mm×0.39 mm (the plane of the sample is perpendicular to the [111] direction), and a total of 5 Ag wires are attached to the sample by using Ag epoxy resin. The attached Ag wires were connected to Cu rods, and Ag wires attached to thermometers and a heater. The sample was loaded on a first frame as shown in FIG. 3. A Hall effect signal was measured at 30K. The temperature of the entire system was reduced to 30K in a helium gas environment, in-situ calibration was performed from 30K to 33K, the temperature of the system was reduced to 30K again, and then a turbo pump was operated. After a high vacuum state was formed, a thermal Hall effect test was performed by supplying a current to the heater and controlling an external magnetic field. Temperature values read by the thermometers were measured at each magnetic field value for about 10 minutes to about 20 minutes and a temperature corresponding to the magnetic field value was calculated through zero-order fitting. Considering all of the inaccuracy of fitting, measurement noise, and temperature stability, the test result shows that the precision of temperature measurement is greater than or equal to 0.1 mK.

Figure 8:
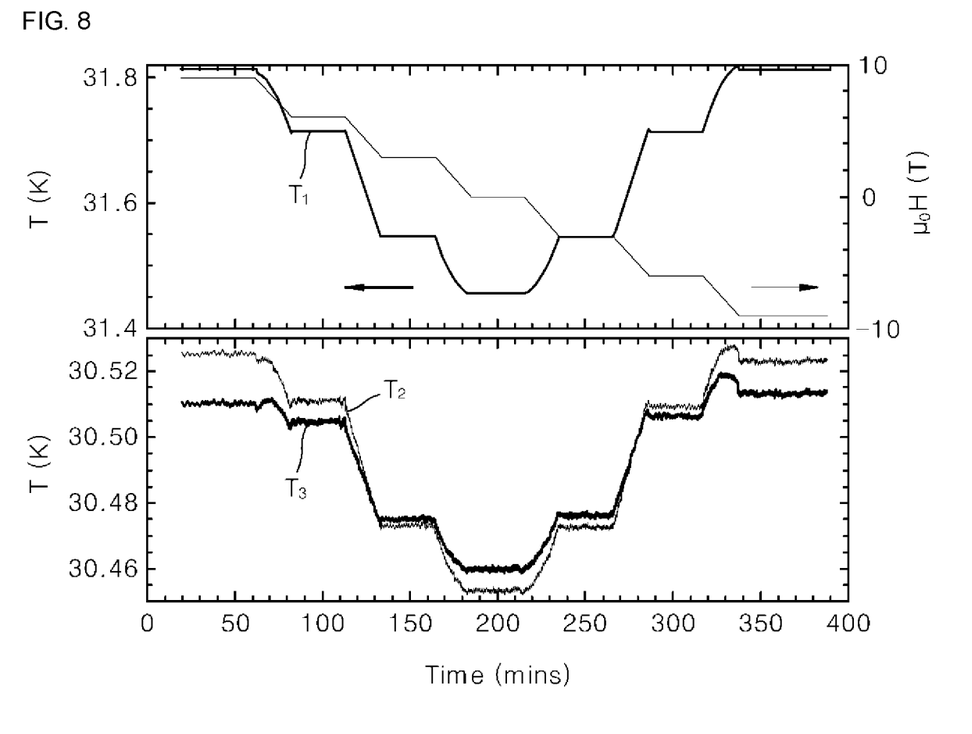
FIG. 8 is a graph showing measured temperatures and an external magnetic field value based on real time in a thermal Hall effect measurement test according to a test example of the present invention.
Figure 9A:
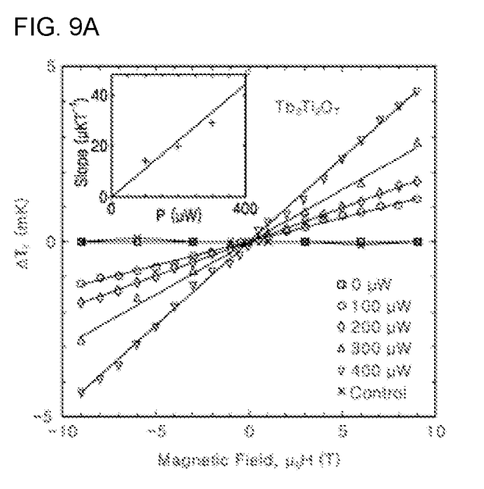
FIG. 9 includes graphs showing thermal Hall effect measurement results according to a test example and a comparative example of the present invention.

FIG. 8 shows variations in temperatures $T_1$, $T_2$, and $T_3$ of the thermometers and the magnetic field over time. FIG. 9A shows a measurement result based on a magnetic field in a case when heat of 0 µW, 100 µW, 200 µW, 300 µW, or 400 µW is applied.

Figure 9B:
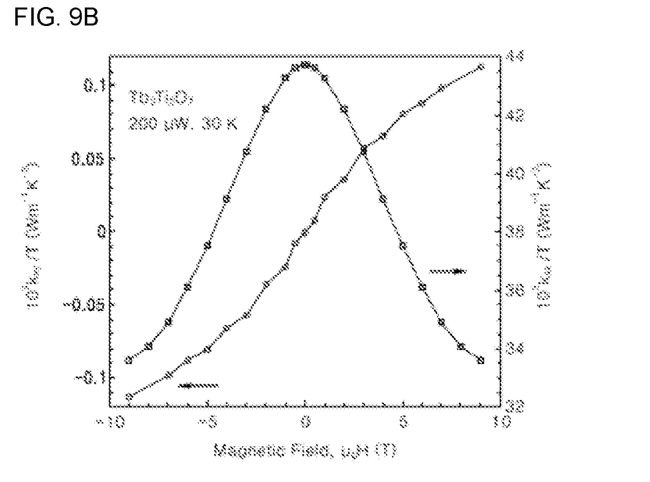

Referring to FIG. 9A, as predicted, $\Delta T_y$ linearly increases in proportion to the intensities of the magnetic field and the applied heat. It is shown that no Hall effect signal is present when no heat is applied. Thermal conductivity and thermal Hall conductivity values were calculated using the measured temperature difference information, and values obtained by dividing the calculated conductivity values by the temperature of the sample are shown in FIG. 9B. The tendency of the measurement result is consistent with that of the previous research result, but the quantitative values thereof are greater than those of the previous research result about 1.5 times. It may be inferred that the above result is obtained because the purity of the monocrystalline sample used in the current test is higher. The measured Hall effect signal is clearly distinguished from a noise signal and this shows that the above-described measurement device and sample loading method operate properly.

Test Example 4: Test Result of Comparative Example

In order to exclude the possibility that the measured signal is an error signal caused by the test setups (e.g., a signal caused by a metallic component such as a Cu rod, Ag epoxy, or an Ag wire), measurement was performed on a comparative example causing no thermal Hall effect. A glass slide was processed to the same size as the $Tb_2Ti_2O_7$ sample. Glass was selected as the comparative example because a thermal conductivity of glass is similar to that of $Tb_2Ti_2O_7$ and thus the intensity of applied heat may be set to be equal. The measurement result is shown in FIG. 9A (as marked by 'Control'). Referring to FIG. 9A, the comparative example did not exhibit a $\Delta T_y$ signal. Therefore, it is shown that the thermal Hall effect signal observed when using $Tb_2Ti_2O_7$ is caused by the sample itself.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A probe system for low-temperature high-precision heat transport measurement, the probe system comprising a sample loader where a sample is loaded,
   wherein the sample loader comprises a first frame comprising a sample loading space, and a second frame comprising an open end coupled to the first frame to accommodate the sample loading space, and
   wherein the first frame comprises:
   a sample supporter on which electrical terminals for conducting electricity from outside are provided;
   a plurality of first support rods provided on a surface of the sample supporter to extend in a direction away from the surface, made of a thermal insulator, and coupled to support lines;
   a plurality of second support rods provided on a surface of the sample supporter to extend in a direction away from the surface, made of a high thermal conductor, and capable of holding the sample;
   thermometers and a heater suspended between the first support rods by the support lines; and
   electricity supply lines connected from the electrical terminals to the thermometers and the heater.

2. The probe system of claim 1, further comprising wire terminals coupled to the thermometers and the heater to connect the sample to the thermometers and the heater.

3. The probe system of claim 1, further comprising a sample holder coupled to an end of a second support rod and capable of holding the sample.

4. The probe system of claim 1, further comprising a puck coupled to another end of the second frame,
   wherein the puck is in contact with a cooling controller of a low-temperature high-precision measurement device.

5. The probe system of claim 1, wherein one or more second support rods other than the second support rod holding the sample are in direct contact with the second frame.

6. The probe system of claim 1, wherein the electricity supply lines comprise:
   electrical line connectors adhered to partial regions of outer circumferential surfaces of the first support rods to extend in the direction where the first support rods extend;
   first conductive wires for connecting the electrical line connectors to the electrical terminals; and
   second conductive wires having ends coupled to ends of the electrical line connectors, and other ends connected to the heater and the thermometers.

7. The probe system of claim 1, wherein the thermometers comprise $SrTiO_3$ capacitance thermometers.

8. The probe system of claim 1, wherein the first support rods comprise ceramic, glass fiber, or resin.

9. The probe system of claim 1, wherein the support lines comprise a polymer material.

10. The probe system of claim 1, wherein the second support rods comprise a metal material.

11. The probe system of claim 6, wherein one or more of the first and second conductive wires comprise platinum (Pt)/iridium (Ir) alloy.

12. The probe system of claim 3, wherein the sample holder comprises sapphire.

13. The probe system of claim 1, wherein the probe system further comprises:
   a probe head;
   a probe connector connected to an end of the probe head; and
   a heat sink comprising an end connected to another end of the probe connector,
   wherein the sample loader is connected to another end of the heat sink.

14. The probe system of claim 13, wherein the probe connector comprises a core frame, and coaxial cables extending to be wound around an outer circumferential surface of the core frame.

15. The probe system of claim 13, wherein the sample loader is detachably connected to the heat sink.

16. The probe system of claim 13, wherein the end of the heat sink is in contact with an inner wall of a chamber of a low-temperature high-precision measurement device by using contact fingers or cold fingers.

17. The probe system of claim 13, wherein the heat sink comprises:
   a body made of a metal material; and
   coaxial cables extending to be wound around an outer circumferential surface of the body.

18. The probe system of claim 17, wherein shields of the coaxial cables are electrically connected to the second frame.

19. A low-temperature high-precision heat transport measurement device comprising the probe system of claim 1,
   wherein the probe system comprises a plurality of $SrTiO_3$ capacitance thermometers, and wherein the plurality of SrTiO$_3$ capacitance thermometers are connected to one capacitance measurement bridge through coaxial relays.

20. A low-temperature high-precision heat transport measurement device comprising the probe system comprising a sample loader where a sample is loaded,
wherein the sample loader comprises a first frame comprising a sample loading space, and a second frame comprising an open end coupled to the first frame to accommodate the sample loading space, and
wherein the first frame comprises:
a sample supporter on which electrical terminals for conducting electricity from outside are provided;
a plurality of first support rods provided on a surface of the sample supporter to extend in a direction away from the surface, made of a thermal insulator, and coupled to support lines;
a plurality of second support rods provided on a surface of the sample supporter to extend in a direction away from the surface, made of a high thermal conductor, and capable of holding the sample;
thermometers and a heater suspended between the first support rods by the support lines;
electricity supply lines connected from the electrical terminals to the thermometers and the heater;
wherein the probe system further comprises:
a probe head;
a probe connector connected to an end of the probe head; and
a heat sink comprising an end connected to another end of the probe connector,
wherein the sample loader is connected to another end of the heat sink,
and wherein the probe system further comprises a plurality of SrTiO$_3$ capacitance thermometers, and
wherein the plurality of SrTiO$_3$ capacitance thermometers are connected to one capacitance measurement bridge through coaxial relays.

* * * * *